United States Patent [19]

Ito et al.

[11] Patent Number: 4,654,773

[45] Date of Patent: Mar. 31, 1987

[54] INVERTER CONTROL CIRCUIT

[75] Inventors: Tomotaka Ito; Katsuhiko Chonan, both of Aichi, Japan

[73] Assignee: Mitsubishi Denki Kabushiki Kaisha, Tokyo, Japan

[21] Appl. No.: 770,526

[22] Filed: Aug. 29, 1985

[30] Foreign Application Priority Data

Aug. 30, 1984 [JP] Japan .................. 59-179356

[51] Int. Cl.⁴ .................. H02M 7/00; G06F 15/20
[52] U.S. Cl. .................. 363/41; 363/97; 364/162
[58] Field of Search .................. 363/40, 41, 95–98, 363/131; 364/161–163

[56] References Cited

U.S. PATENT DOCUMENTS

| | | | |
|---|---|---|---|
| 4,290,108 | 9/1981 | Woehrle et al. | 363/41 X |
| 4,312,031 | 1/1982 | Kudor | 363/41 |
| 4,337,429 | 6/1982 | Stuart | 363/41 X |
| 4,348,734 | 9/1982 | Dougherty | 363/41 X |
| 4,447,786 | 5/1984 | Saar et al. | 363/41 X |
| 4,466,070 | 8/1984 | Claussen | 363/96 X |

FOREIGN PATENT DOCUMENTS

| | | |
|---|---|---|
| 56-121369 | 9/1981 | Japan . |
| 57-3582 | 1/1982 | Japan . |
| 57-46677 | 3/1982 | Japan . |

Primary Examiner—Patrick R. Salce
Assistant Examiner—Emanuel Todd Voeltz
Attorney, Agent, or Firm—Bernard, Rothwell & Brown

[57] ABSTRACT

An inverter control circuit produces pulse width modulated waveform patterns approximating an a.c. power sine wave signal from a sequence of data words stored in ROM wherein the sequence is cycled over an interval corresponding to 7.5° or 15° of the desired sine wave. Respective portions of a 0°–60° segment and a 120°–180° segment of the desired sine wave are generated from corresponding bits of the words during successive 7.5° or 15° intervals. The 60°–120° segment is approximated by a steady state signal. Inversions of the 0°–60°, 60°–120° and 120°–180° segments form the corresponding 180°–240°, 240°–300° and 300°–360° segments. Selection of the appropriate generated segments during successive 60° intervals produces one or more phases of the desired power signal. Further reduction in ROM requirement is made by stored data corresponding to only the first 30° portions of the 0°–60° and 120°–180° segments; the full 60° segments are formed by reversing the read out sequence, as well as the selector operation, during the second 30° portion of the 60° segments.

7 Claims, 12 Drawing Figures

FIG. 9
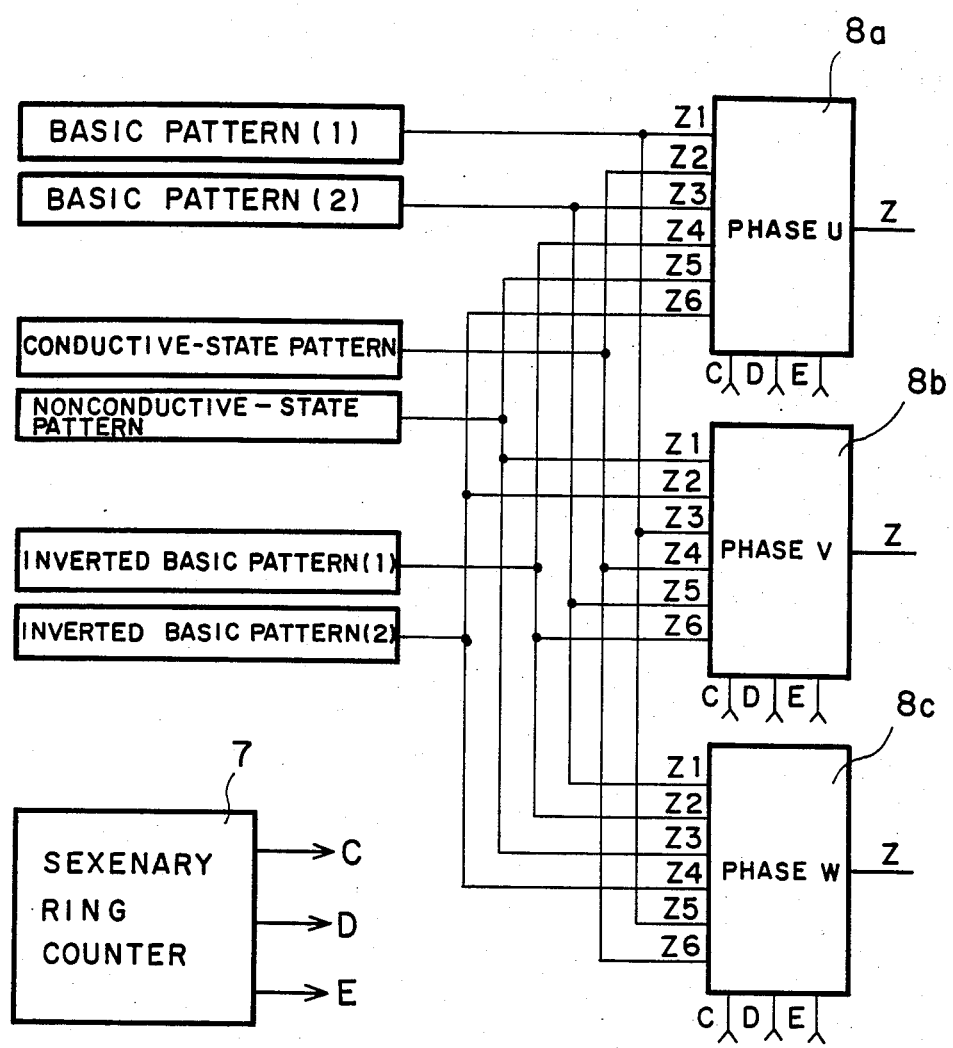
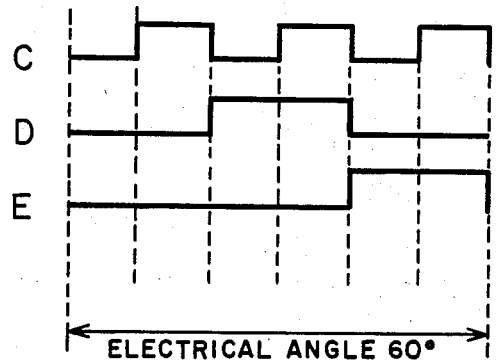
ELECTRICAL ANGLE 60°

INVERTER CONTROL CIRCUIT

BACKGROUND OF THE INVENTION

1. Field of the Invention

The present invention relates to an inverter control circuit and more particularly to an inverter control circuit which controls the output of the inverter based on waveform patterns stored in a storage element.

2. Description of the Prior Art

As a control circuit of this type, there is one in use as shown in FIG. 1. Referring to the drawing, reference numeral 1 denotes a frequency command circuit, 2 denotes a rate multiplier, 3 denotes an oscillator, 4 denotes a frequency divider, 5 denotes a counter, 6 denotes a read only memory (hereinafter to be called a ROM), 7 denotes a sexenary ring counter, and 8 denotes a data selector.

Now, operation of the inverter control circuit in FIG. 1 will be described. An 8-bit output from the frequency command circuit 1 is sent to the rate multiplier 2. The output signal $F_0$ from the rate multiplier 2 is given by the followihg equation (1):

$$F_0 = \frac{K}{256} \cdot F_i, \qquad (1)$$

where K is a constant depending on the 8-bit input signal to the rate multiplier 2 and $F_i$ is the output frequency from the oscillator 3. The frequency $F_0$ of the output signal from the rate multiplier 2 is divided by the frequency divider 4 into a predetermined output frequency $F_{CK}$ and then input to the counter 5. Here, if the case where the ROM 6 is of 12 bits and therefore has a storage capacity of 4096 words, for example, is considered, the ROM 6 will then have data stored therein such that one period of an a.c. control signal divided by 6 at intervals of 60° in electrical angle as shown in FIG. 2 will be output therefrom corresponding to the first to sixth bits out of the eight bits of the output of the ROM 6. The 6-bit signals output from the ROM 6 are input to the data selector 8, where data selection is made in response to an output signal from the sexenary ring counter 7, which operates taking the eighth bit frequency $F_8$ of the counter 5 as its clock, so that an a.c. control signal for a duration of one period is formed. The a.c. control signal for the remaining two phases at a lagged angle of 120° and at another lagged angle of 120° is formed likewise, and thus, a digital 3-phase a.c. signal is output therefrom.

Here, the frequency $F_{CK}$ is decided to be such that the eighth bit frequency $F_8$ of the counter 5 will take the frequency which will be expressed by the following equation corresponding to a 60° electrical angle of the a.c. control signal:

$$F_8 = F_{CK} \times \frac{1}{2^8}. \qquad (2)$$

Then, the data corresponding to the 60° electrical angles of the a.c. control signals can be stored in 256 divisions and 0.24° electrical angle resolution (60°/256≈0.24°) is obtained.

While the prior art inverter control circuit is structured as described above, the voltage resolution (8 bits=6 bits+2 bits (clock, etc.)) of the inverter for its output voltage is such that only 16 sorts of output voltages can be provided, since, when using the ROM (4,096 words) to which 12 bits are input, the voltage control is made only by the remaining 4 bits. Therefore, for variations in frequencies from 0 to 60 Hz, for example, the output voltage can only be varied at 4 Hz intervals. Accordingly, there has been a disadvantage in the prior art that the V/f characteristic which is an essential characteristic to an inverter has been such that the same is only capable of coarse controlling to vary the output voltages at 4 Hz frequency intervals.

SUMMARY OF THE INVENTION

The present invention has been made to overcome the disadvantage involved in the prior art control circuit. The primary object of the present invention is the provision of an inverter control circuit wherein the waveform patterns for phase voltages will be provided by an ingenious device in the circuit structure, which enables efficiency in usage of the ROM to be enhanced and the resolution of the ROM for the a.c. control signal to be improved while the storage capacity of the ROM is kept at the minimum.

BRIEF DESCRIPTION OF THE DRAWINGS

FIGS. 8 and 9 are drawings for explaining a three-phase a.c. control signal provided by selection and combination of the waveform patterns stored in the ROM;

DETAILED DESCRIPTION OF THE PREFERRED EMBODIMENT

Figure 4:
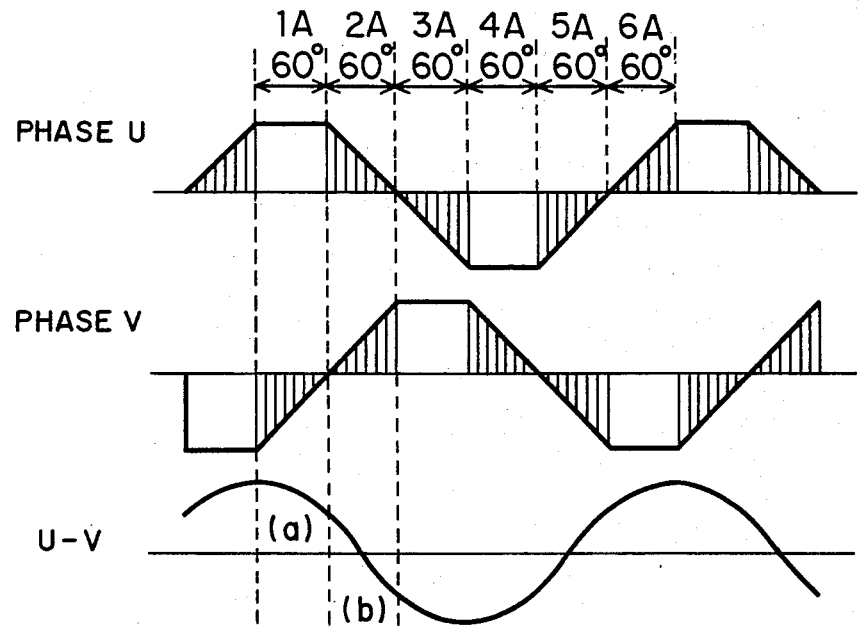
FIG. 4 is a drawing for explaining the waveform patterns for phase voltages used in the present invention.
Figure 5:
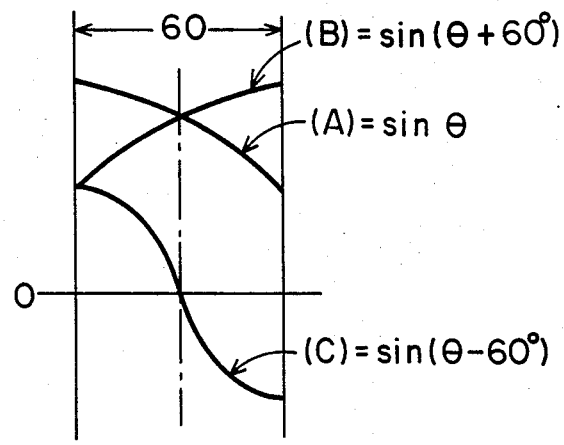
FIG. 5 is a drawing for explaining the basic idea of the waveform patterns of FIG. 4.

A preferred embodiment of the present invention will be described below with reference to the accompanying drawings. FIG. 4 is a drawing for showing waveform patterns for phase voltages used in the present invention, where are shown only phases U and V out of three phases U, V, and W. When the 60° domain 1A in FIG. 4 is considered, a transistor in the phase U will be in a conductive state. A transistor in the phase V will make a switching operation according to the waveform pattern to be provided by the voltage difference between the phases U and V, namely, the line voltage U−V which is indicated by (a). If, then, the 60° domain 2A is considered, the waveform pattern for the phase U is just a reversed pattern of that for the phase V in the domain 1A. And the waveform pattern for the phase V in the domain 2A is symmetrical with the pattern for the phase U about a line, and as a result, the line voltage U−V is provided as indicated by (b). These situations are put in order and indicated in FIG. 5. In FIG. 5, the waveforms (A) and (B) are considered to be in correspondence with the waveform patterns for the phases U and V in the domain 2A in FIG. 4. Then, the waveform (A) or (B) represents the voltage varying tendency in the portion (a) of the line voltage U−V, and the difference between the waveform (A) and (B), or the waveform (C), represents the voltage varying tendency in the portion (b). In the above mentioned waveform patterns for phase voltages, the phases to be controlled by switching are only two in every 60° domain, while a transistor for the remaining phase may be in a conductive or nonconductive state. Therefore, if these two kinds of waveform patterns (hereinafter to be called basic patterns) are taken as basic patterns for a 60° domain, the waveform pattern for the remaining phase in the same domain will be provided by reversing the above basic patterns.

Now, it is apparent even from FIG. 5 that the two basic patterns in a 60° domain are symmetrical about a line at the 30° point. If these two kinds of basic patterns are considered to be those provided for the phases U and V, the waveform pattern for the phase U in the first 30° domain corresponds to that for the phase V in the second 30° domain, and that for the phase V in the first 30° domain corresponds to that for the phase U in the second 30° domain. Therefore, it is conceivable that the ROM 6 is arranged to store the waveform pattern only for 30° domains, and the storage address in the ROM 6 for a first 30° domain is adapted to be accessed in the reverse direction for providing the waveform pattern for the second 30° domain, and the data for the phases U and V are adapted to be exchanged with each other in the second 30° domain. Thus, it is made possible to provide the basic patterns for 60° domains in the described manner.

Figure 6:
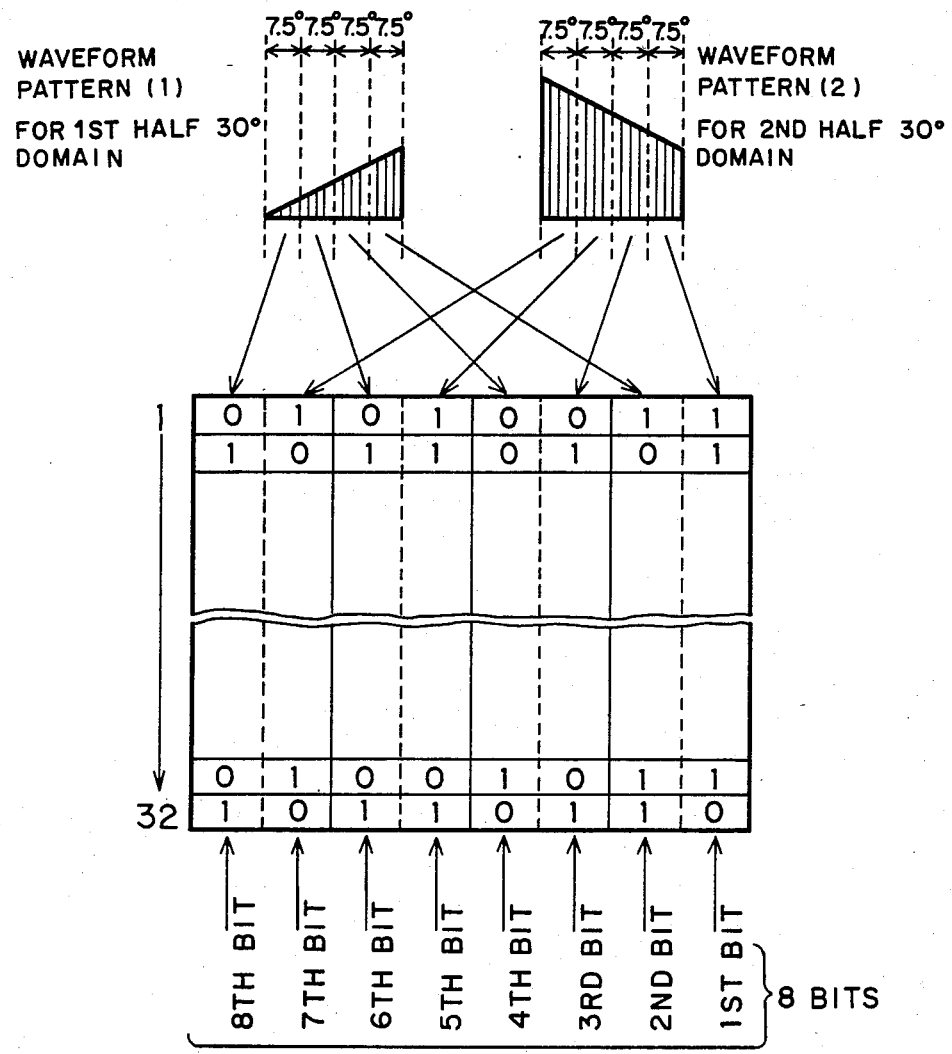
FIG. 6 is a drawing for explaining the manner of storage in the ROM in an embodiment of the present invention.

FIG. 6 is a drawing for explaining two kinds of waveform patterns for a first 30° domain stored in the ROM 6.

The two kinds of waveform patterns are each divided into four divisions each for an electrical angle of 7.5°, and the eight pieces of data in all are each arranged to be stored corresponding to each bit. Here, the resolution equal to the prior art control circuit (the electrical angle resolution $\approx 0.24°$) is attained by the storage capacity of 128 bytes for waveform patterns for the 30° domain. Hence, two kinds of waveform patterns can be stored by 32 bytes and the frequency command input bits required for the ROM 6 can be provided by five bits.

Figure 1:
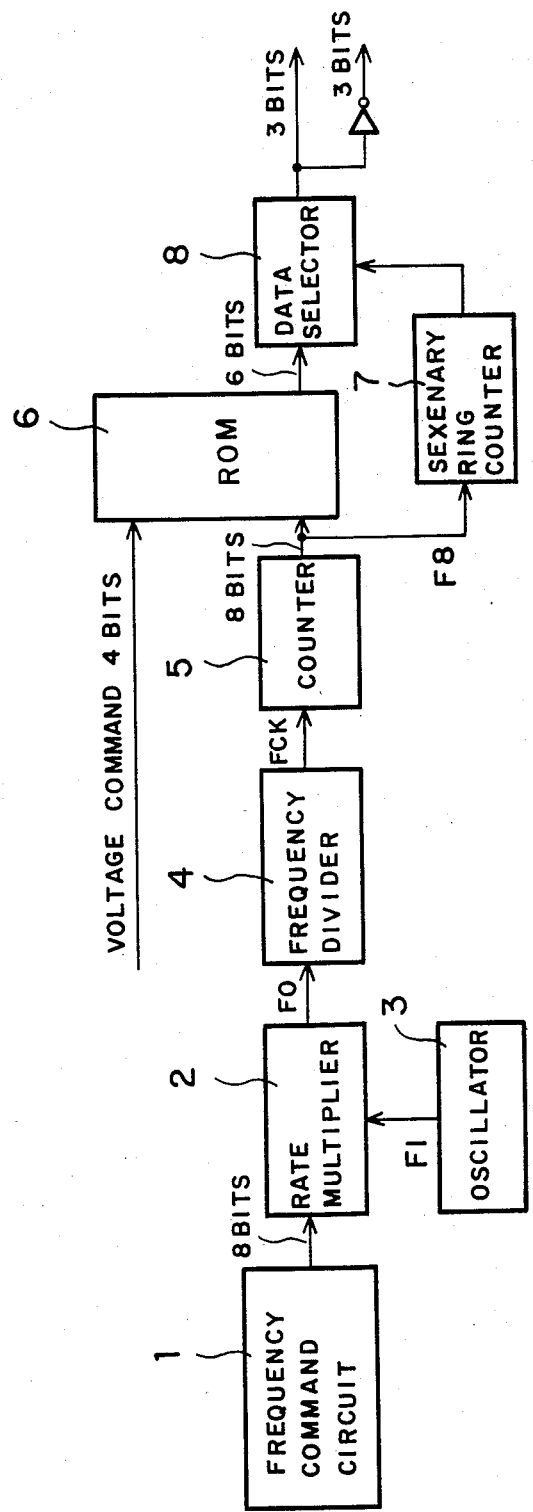
FIG. 1 is a block diagram showing a prior art inverter control circuit.
Figure 2:
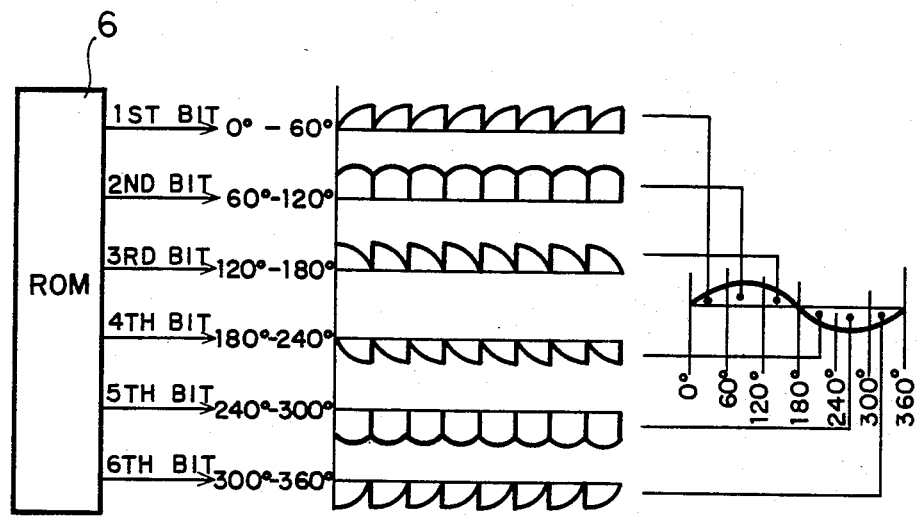
FIG. 2 is a drawing for explaining the manner of storage in the prior art control circuit.
Figure 3:
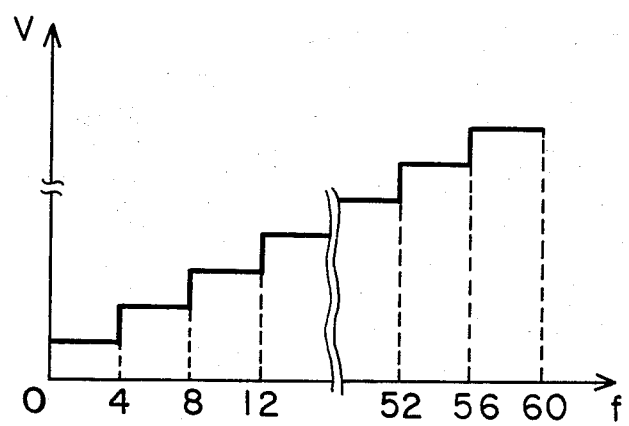
FIG. 3 is a graph showing relationship between the output voltages and output frequencies in the prior art inverter control circuit.
Figure 7:
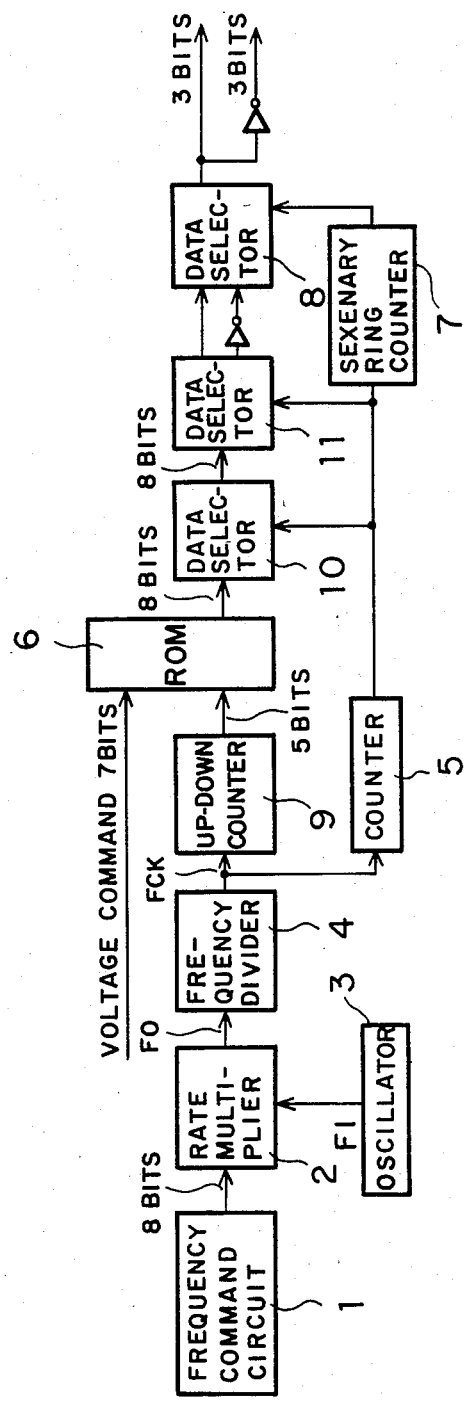
FIG. 7 is a block diagram showing an inverter control circuit of an embodiment, of the present invention.

FIG. 7 is a block diagram for generating the waveform patterns for phase voltages as shown in FIG. 4. Referring to the drawing, waveform patterns stored in the ROM 6 are read out in response to the seven-bit voltage command and basic patterns are generated therefrom and the output data are rearranged by the data selectors which act in response to the clocks in synchronism with predetermined electrical angles and thus the waveform patterns for phase voltages as shown in FIG. 4 are provided. In the drawing, like reference numerals designate like parts in FIG. 1. Reference numeral 9 denotes an up-down counter, and 10 and 11 denote a first and second data selectors, respectively. Here, the waveform patterns for 30° domains as shown in FIG. 6 are previously stored in the ROM 6, and the data corresponding to the 5-bit designated addresses output from the up-down counter 9 are output from the first to eighth bits of the ROM 6. The up-down counter 9 operates as an up counter for the waveform pattern for the first 30° domain as stated earlier and the addresses change in the direction 00 (H)→1F (H), and operates as a down counter for the second 30° domain and the addresses change in the direction 1F (H)→00 (H).

The first data selector 10 exchanges the 8th bit with the 7th bit, the 6th bit with the 5th bit, the 4th bit with the 3rd bit, and the 2nd bit with the 1st bit of the 8-bit data of the output from the ROM 6 for an electrical angle 30°, and produces the waveform patterns for the second 30° domain.

Figure 8:
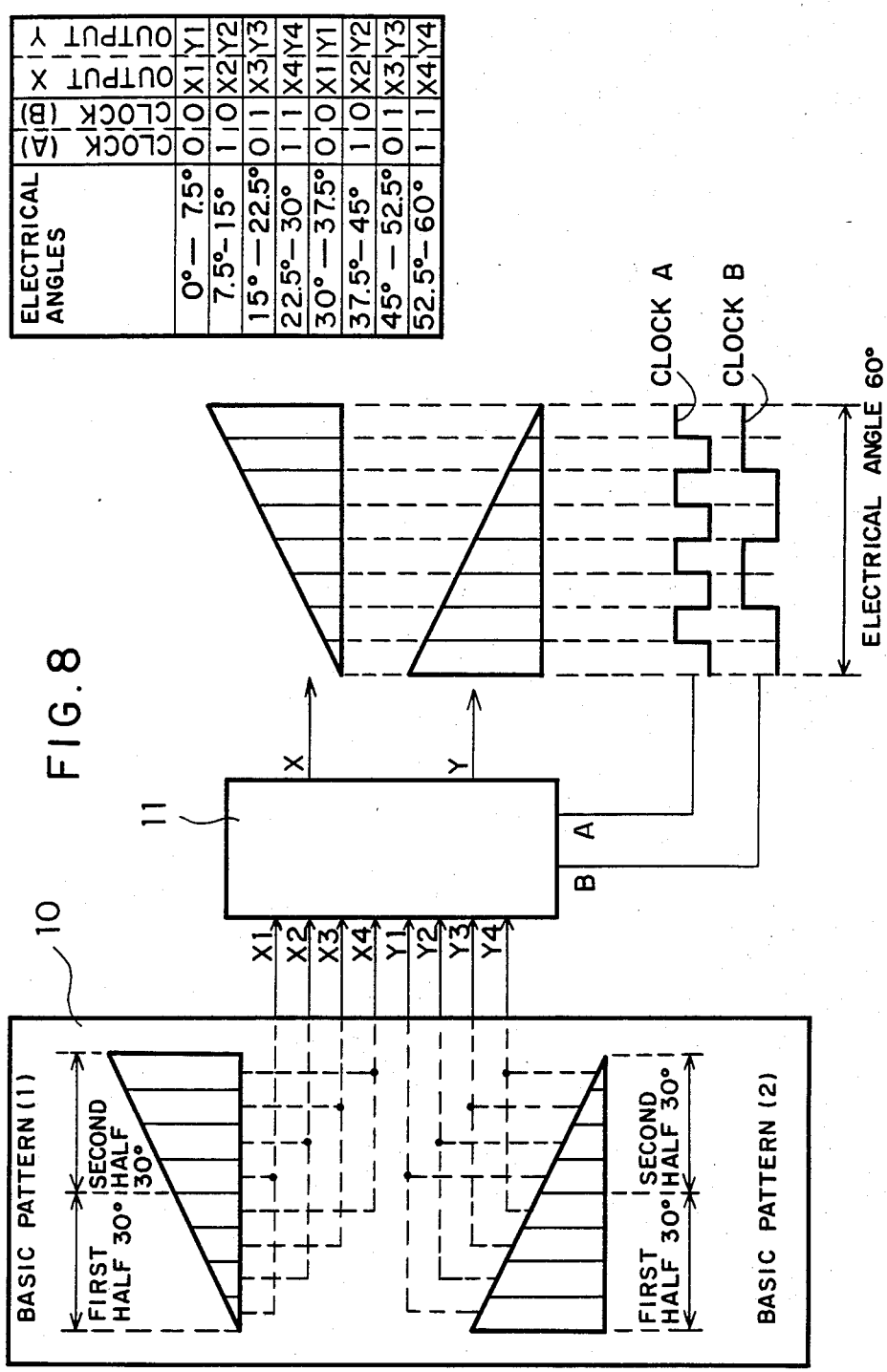

The waveform patterns divided into four divisions each thereof being for 7.5° electrical angle are treated by the second data selector 11 for selection in accordance with the clocks synchronized with predetermined electrical angles and a basic pattern (1) and a basic pattern (2) for the electrical angle 60° are output from data selector 11. These circumstances are as shown in FIG. 8. According to the drawing, data X1 to X4 and Y1 to Y4 at intervals of 7.5° of electrical angles are selected as the output from the data selector 11 in accordance with the clock (A) whose period is 15° and the clock (B) whose period is 30°, and as the data X1 to X4 and Y1 to Y4, the waveform patterns for the first 30° domain and the second 30° domain are alternately output at intervals of 30° of electrical angles. As a result, the basic patterns (1) and (2) are generated at intervals of 60° of electrical angles. By the way, the clocks (A) and (B) are provided by the counter 5 in FIG. 7.

FIG. 9 is a drawing for showing an example of the three-phase a.c. voltage generating circuit, in which the waveform patterns for three phase voltages as shown in FIG. 4 are formed by the third data selector 8 from the signals output by the data selector 11. The data selector 8 is constituted of the same type of three data selectors 8a, 8b, and 8c, each having six inputs Z1 to Z6. The six inputs are selected at intervals of 60° of electrical angles by the signals C, D, and E, which are output from the sexenary ring counter 7 and constitute the period of 360° electrical angle shown in the drawing, and sent out as the output Z. To the six inputs are applied signals for the basic patterns (1) and (2), a conductive-state pattern, a nonconductive-state pattern, and the reversed signals of the patterns (1) and (2). Needless to say, the basic patterns (1) and (2) are those output from the data selector 11. For producing the reversed signals of the basic patterns (1) and (2), a logical inverting element is inserted in the circuit. For giving the conductive-state and nonconductive-state patterns, fixed signals providing logical "1" and "0" can be used. The six patterns are to be switched from one to another at intervals of 60° of electrical angles as stated earlier, and therefore, the circuits are interconnected so that the input to the data selector 8b lags by 120° in electrical angle behind the input to the data selector 8a, namely, the signal applied to the input Z1 of the data selector 8a, for example, is applied to the Z3 of the data selector 8b (the same rule is applied likewise to signals Z2 to Z6). The circuits are also arranged between the data selector 8c and 8b so that the similar relationship is held therebetween, and thus, the outputs Z of the data selectors provide a three-phase a.c. control signal.

Figure 10:
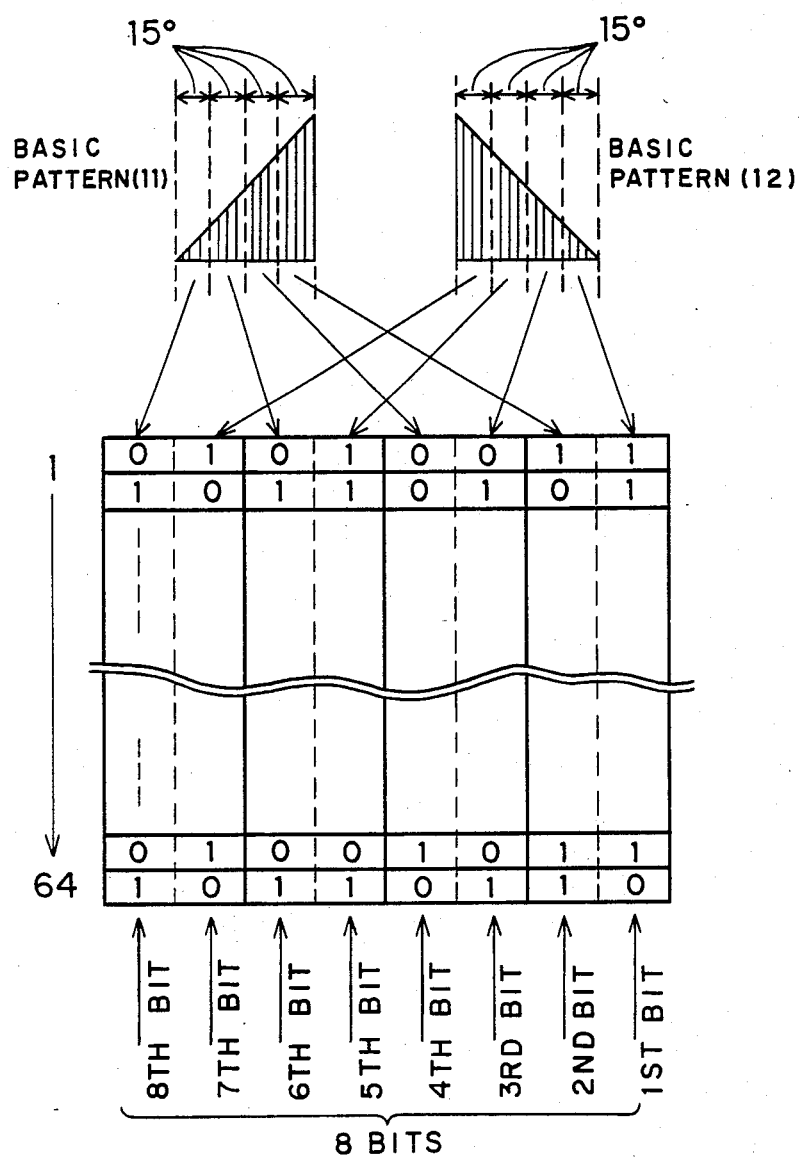
FIG. 10 is a drawing for explaining the manner of storage in the ROM in another embodiment of the present invention.

FIG. 10 is a drawing for showing structure of basic patterns stored in a ROM in another embodiment of the present invention. In this case, two kinds of basic patterns (a basic pattern (11) for a domain of 0° to 60° of phase angles and another basic pattern (12) for a domain 120° to 180° of phase angles) are each divided into four divisions of 15° electrical angle, and these 8 kinds of data are each stored in a ROM in accordance with each bit. Here, the resolution equal to that of the prior art control circuit (the electrical angle solution $\approx 0.24°$) is attained by the storage capacity of 256 bytes for waveform patterns for the 60° domain. Hence, two kinds of basic patterns can be stored by 64 bytes and the frequency command input bits required for the ROM can be provided by 6 bits.

Figure 11:
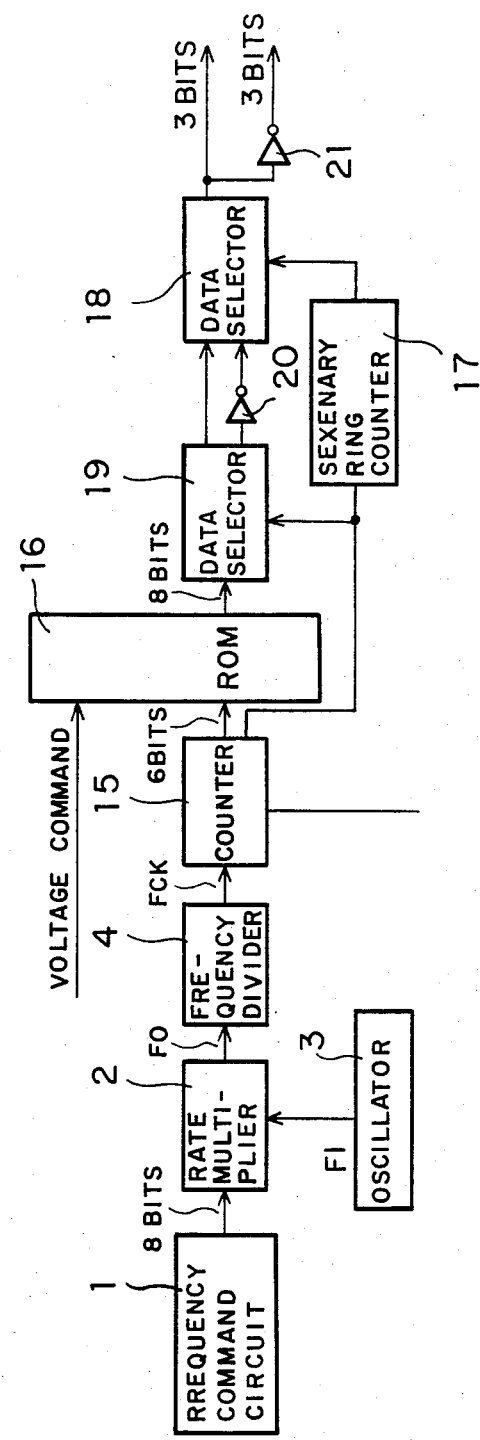
FIG. 11 is a circuit diagram of a circuit for reading out waveform patterns stored in a ROM.

FIG. 11 is a diagram for showing an inverter control circuit of the present invention for generating waveform patterns for phase voltages as shown in FIG. 4 by reading out the basic patterns stored in the ROM and rearranging the data in data selectors working in response to clocks in synchronism with predetermined electrical angles. In the circuit, a data selector 19 is provided on the output side of the ROM 16 and the data selector 19 is connected with a data selector 18 directly and via a logical inverting element 20. The data selector 19 is directly connected with a counter 15 and the data selector 18 is connected with the counter 15 through a sexenary ring counter 17. All other arrangements in the circuit are the same as those in the circuit shown in FIG. 1.

Figure 12:
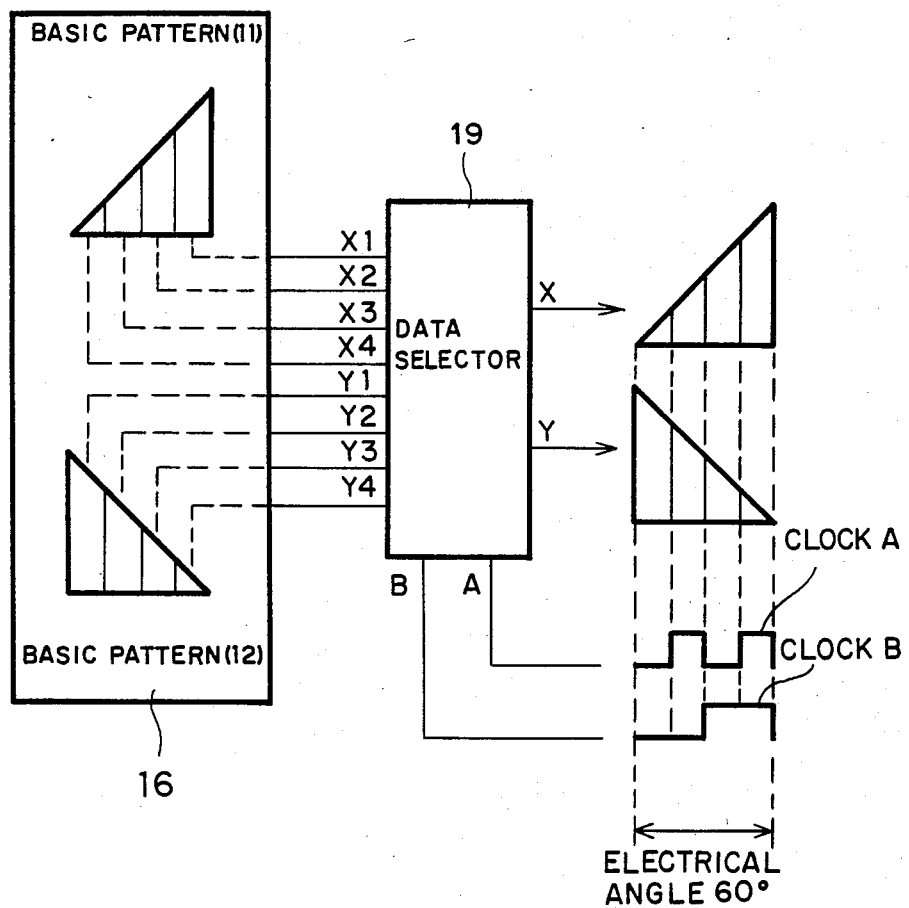
FIG. 12 is a drawing for explaining the circuit of FIG. 11 for obtaining the three-phase a.c. control signal formed of the waveform patterns for phase voltages as shown in FIG. 4 through selection and combination of waveform patterns (stored in a ROM).

The basic patterns (11) and (12) as shown in FIG. 10 are stored in the ROM 16, and the data corresponding to the addresses designated by the output from the counter 15 in 6 bits are output in the first to eighth bits from the ROM 16. From the 8-bit data, the data selector 19 picks out the basic patterns (11) and (12) each divided in four divisions of 15° electrical angle in response to clocks in synchronism with predetermined electrical angles and outputs the basic patterns (11) and (12) which are arranged as the waveform patterns for 60° of electrical angle. Circumstances of the output are shown in FIG. 12.

According to FIG. 12, the outputs X1 to X4 and Y1 to Y4 are picked out in the data selector 19 as shown in the following table by means of the clock A whose period is 30° and the clock B whose period is 60° and, in consequence, the basic patterns (11) and (12) are generated at intervals of 60° electrical angles. The above clocks A and B can be provided by the counter 15 in FIG. 11.

| ELECTRICAL ANGLES | CLOCKS A | CLOCKS B | OUTPUTS X | OUTPUTS Y |
|---|---|---|---|---|
| 0°–15° | 0 | 0 | X1 | Y1 |
| 16°–30° | 1 | 0 | X2 | Y2 |
| 30°–45° | 0 | 1 | X3 | Y3 |
| 46°–60° | 1 | 1 | X4 | Y4 |

As described so far, the present invention has enabled the three-phase a.c. control voltage with the same electrical angle resolution as that in the prior art to be provided by combination of five bits while using a ROM of the same capacity as that used in the prior art, for example, a ROM of 12-bit input (4,096 words). Therefore, the remaining 7 bits have become usable for providing the resolution in the voltages for controlling the output voltages of the inverter. Thus, 128 sorts of output voltages have become obtainable, or eight times finer voltage resolution than that of the prior art has become obtainable, and therefore, it has been made possible to greatly improve the efficiency in the controlling.

That is, according to the present invention, it has been arranged that one phase of the a.c. control signal for an inverter for obtaining three-phase a.c. power is divided at intervals of 60° electrical angles and the waveform patterns of the portions corresponding to 0° to 60° and 120° to 180° of phase angles are stored in a memory unit, and a three-phase a.c. control signal with its phases at 120° phase differences with each other is obtained by combination of the waveform patterns read out from the memory unit, inverted signals to these waveform patterns, and a conductive-state pattern and nonconductive-state pattern provided by switching elements constituting the inverter. Thus, when a 12-bit input, 4,096 words of ROM, for example, is used, it has been made possible to provide the same electrical angle resolution as hitherto only by 6 bits and the voltage resolution which corresponds to the output voltage of the inverter is provided by remaining 6 bits. As a result, 64 sorts of output voltages have become providable and, after all, four times finer voltage resolution in comparison with the prior art control circuit obtainable, and therefore, while the storage capacity of the ROM is kept at the minimum, the efficiency in use of the ROM has been enhanced and the resolution of the ROM for the a.c. control signal has been improved.

What is claimed is:

1. An inverter control circuit comprising: a storage unit storing in accordance with respective bits thereof data of waveform pattern segments obtained by dividing at intervals of predetermined electrical angles waveform patterns corresponding to portions of 0° to 60° and 120° to 180° phase angles, which are taken out of divisions divided at intervals of 60° of electrical angles of a sine period of an a.c. control signal for an inverter for obtaining three-phase a.c. power;

first data selector means for selecting data out of those stored in said storage unit in response to clocks in synchronism with said predetermined electrical angles for outputting said waveform patterns;

logical inverting means for forming inverted signals of said waveform patterns output from said first data selector; and second data selector means for receiving as inputs thereto said waveform patterns, said inverted signals of said waveform patterns, a conductive-state pattern and a nonconductive-state pattern and operated by clocks in synchronism with each 60° portion of the a.c. control signal for outputting a three-phase a.c. control signal whose phases have 120° of phase differences therebetween.

2. An inverter control circuit for generating a desired pulse width modulated (PWM) waveform pattern which can be used to approximate a desired variable-frequency A.C. power sine-wave signal, comprising a ROM for storing a plurality of words each having a plurality of bits representing respective portions of a desired PWM waveform segment corresponding to a selected 60° segment of the desired A.C. sine-wave signal, counter means having outputs connected to address inputs of the ROM for applying sequences of address bits to the ROM such that the ROM produces a plurality of cycles of sequences of the plurality of words over a period corresponding to the selected 60° segment of the desired A.C. sine-wave signal, means operated by the counter means and connected to outputs of the ROM for generating the desired PWM waveform pattern, and said generating means including data selector means controlled by the counter for selecting a corresponding bit from the words produced by the ROM during each cycle of the sequence of words to produce the desired PWM waveform segment corresponding to the selected 60° segment of the desired A.C. sine-wave signal.

3. An inverter control circuit according to claim 2 wherein each word of the plurality of words in the ROM includes a first plurality of bits representing respective portions of one desired PWM waveform portion corresponding to a first 30° domain of one 60° segment of the desired A.C. sine-wave signal, and a second plurality of bits representing portions of a desired PWM waveform portion corresponding to a first 30° domain of another 60° segment of the desired A.C. sine-wave signal, said one and another 60° segments being mirror images; wherein said counter means includes an up/down counter for counting upward to generate a plurality of upward sequences of address bits during the first 30° portion of each 60° segment of the desired A.C. sine-wave signal and for counting downward to generate a plurality of downward sequences of address bits during the second 30° portion of each 60° segment of the desired A.C. sine-wave signal; and data selector means, during the generation of a desired PWM waveform segment corresponding to the one 60° segment, selecting bits from the first plurality of bits in each word generated during the first 30° domain of the one 60° segment and selecting bits from the second plurality of bits in each word generated during the second 30° domain of the first 60° segment.

4. An inverter control circuit according to claim 3, wherein there are four counter cycles during each 30° domain of the A.C. signal and said first and second pluralities are both equal to four, and each word stored in the ROM contains eight bits-defining respective portions of the desired PWM waveform.

5. An inverter control cicuit according to claim 2, wherein said ROM contains several pluralities of words defining several respective PWM waveform patterns, and said ROM has second address inputs for receiving a seven-bit voltage command to select one of the several PWM waveform patterns for generation.

6. An inverter control circuit according to claim 2 wherein said data selector means includes first and second data selector means controlled by the counter means for selecting respective bits from the words of each sequence of words to generate two non-inverted and two inverted outputs wherein each of the two non-inverted outputs and each of the two inverted outputs correspond to respective 60° mirror image segments of the desired A.C. signal; and third data selector means controlled by the counter means for selecting from the two non-inverted outputs, the two inverted outputs, and two steady state signals for generating the desired PWM waveform pattern.

7. An inverter control circuit as claimed in claim 6 wherein the third data selector means includes three data selectors operated by the counter means 120° out of phase from each other so that the three data selectors select from the two non-inverted outputs, the two inverted outputs and the steady state signals for generating respective PWM waveform patterns corresponding to desired variable frequency three phase power signals.

* * * * *